June 11, 1935.　　　　D. S. KENNEDY　　　　2,004,554
PULLEY DRUM FOR MOTOR VEHICLES
Filed Aug. 13, 1934　　　2 Sheets-Sheet 2

Inventor:—
Donald S. Kennedy,
By:- Smith, Michael & Gardiner,
Attorneys.

Patented June 11, 1935

2,004,554

UNITED STATES PATENT OFFICE 2,004,554

PULLEY DRUM FOR MOTOR VEHICLES

Donald Stuart Kennedy, Longparish, Hampshire, England

Application August 13, 1934, Serial No. 739,689
In Great Britain January 10, 1934

5 Claims. (Cl. 180—53)

This invention relates to pulley drums or winches for motor vehicles, and more particularly to devices of the type in which the drum is mounted concentrically with one of the normally driven road wheels and is rotatable by the corresponding axle shaft extending from the differential gear of the vehicle, means being provided whereby the normal road wheel drive can be diverted to the pulley drum, which enables the latter to be operated by power while the wheel remains stationary upon the ground.

The invention has for its main objects to provide an improved mounting for the drum, the latter being connected in a positive manner to the axle shaft and having a bearing in or upon a member to which the road wheel is secured; to provide a detachable connection between the drum and the road wheel, which can readily be engaged or disengaged as required; and to provide an arrangement which allows the ready removal and replacement of the road wheel in the event of damage to the wheel or tire.

The invention is hereafter described with reference to the accompanying drawings, in which.

Figure 1:
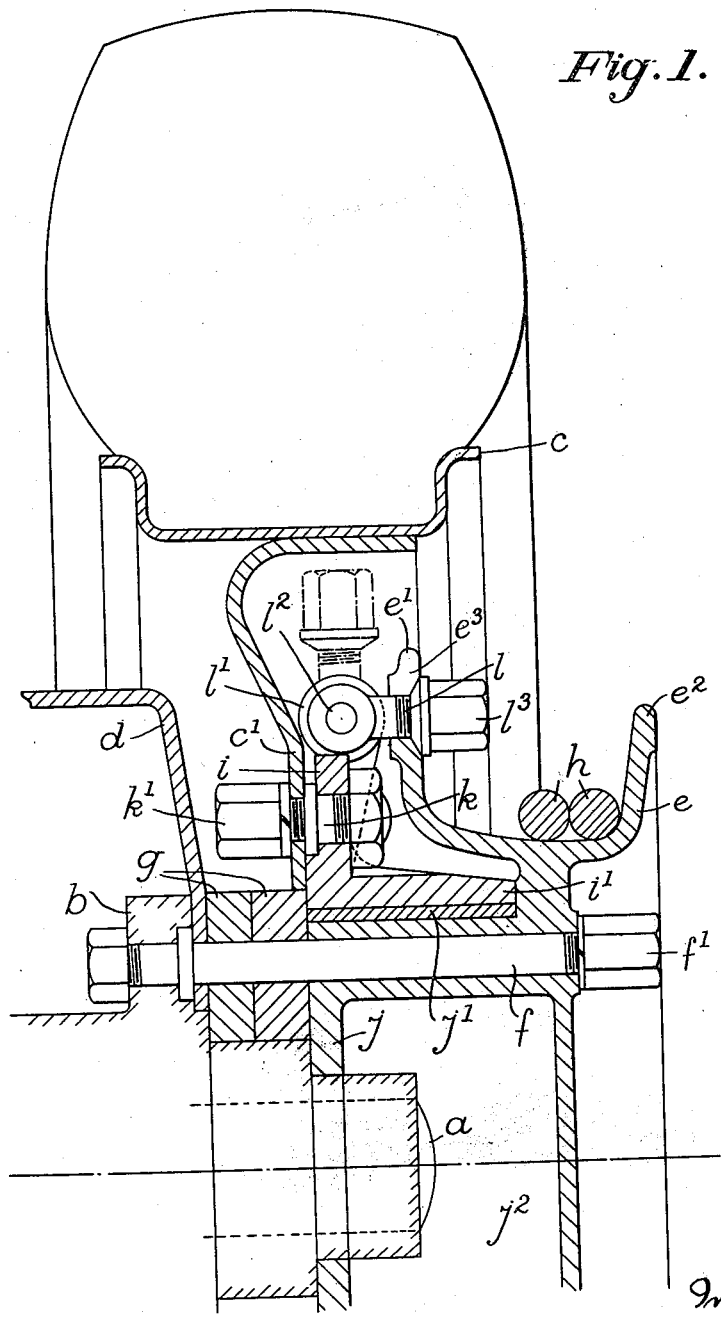
Figs. 1 and 2 represent part sectional elevations showing examples of the application of my pulley drum to driving axles of two different motor vehicles.

Referring to Fig. 1, the axle shaft $a$ which is driven by the engine of the vehicle through the transmission gear box and differential in the usual way, is fitted with a driving member $b$ to which, in the normal construction, the road wheel $c$ and its brake drum $d$ are bolted or otherwise secured; this driving member $b$ is utilized for securing the pulley or winding drum $e$, according to the present invention, the drum being connected thereto by long bolts $f$ with nuts $f^1$ and one or more packing rings $g$ of suitable shape, so that the drum is rotatable by and with the axle shaft $a$, through the medium of the driving member $b$ and the bolts $f$. The drum $e$ is provided with inner and outer rims or peripheral flanges $e^1$ $e^2$ at its respective sides, and it is shown so shaped that it can be used for a rope or cable $h$; obviously the drum can be so shaped as to be adapted for use with a belt or chain in order to convey the drive to an adjacent machine of any kind, as already well known in the art. The body of the drum, through which the bolts $f$ are passed, provides a hub or hollow boss $j$ on the inner side, upon which there is mounted a bearing member consisting of an annular flange-plate $i$ formed integrally with a cylindrical sleeve $i^1$ rotatable upon a floating bush $j^1$, to which lubricant may be supplied through suitable oil-ways (not shown) from a reservoir $j^2$ in the interior of the hub boss. The packing ring $g$ held against the inner face of the boss $j$ by the bolts $f$ serves to retain the bearing sleeve $i^1$ in position with sufficient axial clearance for free rotation.

The road wheel $c$ is shown as of the disc type, the flat central portion of the disc $c^1$, which is normally bolted to the brake drum $d$ and driving member $b$, being bored out to clear the packing rings $g$ and secured by bolts $k$ to the flange-plate $i$; the latter in turn can be detachably connected to the drum $e$ by any suitable quickly-operated disconnectible device which breaks the continuity of the drive between the pulley drum $e$ and the road wheel $c$. In the preferred form this device comprises a plurality of swivelling bolts $l$ arranged externally of the flange-plate $i$ upon radial lugs $l^1$; the swivel pivots $l^2$ allowing the bolts $l$ to be turned down (as shown in full lines) so as to enter radial open-ended slots $e^3$ in the inner flange or rim $e^1$ of the drum; the nuts $l^3$ upon the bolts $l$ can then be tightened up to lock the flange-plate and pulley drum together for conveying the drive from the drum to the flange-plate and road wheel in ordinary running. The road wheel is thus rotatable with the pulley drum, but when the road wheel is stationary and the swivelling bolts $l$ are released from the slotted flange $e^1$ (as indicated in dotted lines), the pulley drum can be rotated by engine power through the transmission and axle shaft, without the road wheel $c$ being driven; the bearing member $i$ $i^1$ remaining stationary while the drum $e$ revolves. By reason of the drive taking place through the ordinary transmission gear box, the pulley drum $e$ can be rotated at different speeds according to the gear ratios available, and in either direction as desired.

If the road wheel has to be changed in the course of a journey, it is necessary also to remove the pulley drum $e$ and the flange-plate $i$. These parts are removable as a single unit by disconnection of the nuts $f^1$ after jacking up the wheel, and the unit can then be placed with the drum resting flat on the ground and the wheel uppermost; the nuts $k^1$ on the inner ends of the bolts $k$ are removed, the wheel lifted off and replaced by the spare, and the latter secured to the flange-plate by means of the nuts $k^1$, the unit being then refitted upon the bolts $f$ and secured by the nuts $f^1$. By providing demountable rims of the well-known kind, it is obviously possible to replace a damaged tire without changing the road wheel itself.

Figure 2:
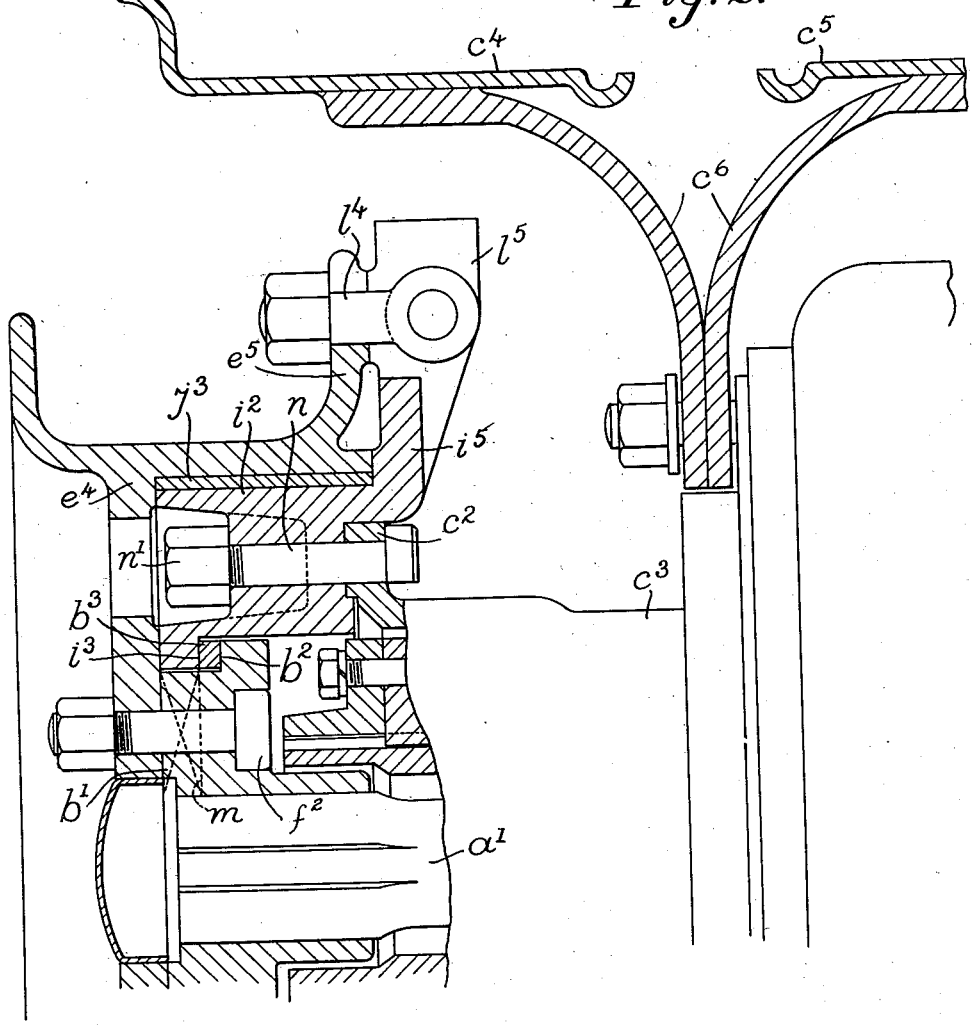

Referring to Fig. 2, the axle shaft $a^1$ is shown provided with a driving member $b^1$ which is secured by bolts $f^2$ to an annular or disc-shaped web $e^4$ of the pulley drum, teeth or dogs $m$ being preferably provided on the abutting faces to transmit the drive to the drum. In this construction, the flange-plate comprises a bearing boss $i^2$ which is rotatable in the interior of the winding drum, a floating bush $j^3$ being preferably interposed; the open center of the boss $i^2$ is formed with an annular rebate $i^3$ which engages rotatably between the web $e^4$ of the pulley drum and a thrust face $b^2$ upon the driving member, a loose washer or wearing ring $b^3$ being interposed. The boss $i^2$ of the flange-plate is secured by bolts $n$ to a flange $c^2$ upon the hub $c^3$ of the road wheel, which is shown as having twin tires mounted upon separate rims $c^4$ $c^5$ carried by offset discs $c^6$ bolted to the hub $c^3$. The flange-plate is detachably connectible to the pulley drum $e$ as in the previous case, for example by means of swivelling bolts $l^4$ pivoted upon radial lugs $l^5$, on the flange $i^5$, and engageable with slots in the inner rim $e^5$ of the drum.

If either of the tires has to be changed, the pulley drum, driving member and flange-plate can be removed from the axle shaft as a single unit by undoing the nuts $n^1$ of the bolts $n$, the tire rim or rims $c^4$ $c^5$ being then unbolted from the hub $c^3$; after changing the tire, the drum and flange-plate unit is then replaced upon the axle shaft and secured by the bolts $n$. In constructions where the removal of the driving member $b^1$ from the axle shaft $a^1$ is not desirable, it may be necessary to undo the nuts of the bolts $f^2$, so that the drum $e^4$ $e^5$ can be removed separately, before the flange-plate is detached from the hub $c^3$.

Where, instead of the twin tires shown in Fig. 2, a single tire is employed, mounted upon a rim $c^4$ having its disc $c^6$ offset for bolting to the inner end of the hub $c^3$, the flange-plate $i^5$ may evidently be arranged for the disc $c^6$ to be bolted direct to it, substantially as in the case of Fig. 1; the wheel will then be fitted with the offset disc $c^6$ turned outwards so that the plane of the wheel remains approximately the same as in the standard arrangement where it is bolted to the hub $c^3$; this will enable the wheel, secured directly to the flange-plate, to be removed as a single unit with the winding drum and flange-plate, as in the case previously described with reference to Fig. 1.

The rope or cable $h$ operated by the pulley drum may be used for various purposes. For example, if the vehicle is held up by wheel spin in boggy ground, cables anchored to trees or to another vehicle in front may be wound round the drums on both sides, so that the vehicle can draw itself forward; if the road wheels are connected to the drums, by the bolts $l$, then the wheels will take up the drive as soon as they obtain a sufficient grip. Similarly the winding cable can be employed for hauling another vehicle out of boggy ground, the hauling vehicle being stationary with its winding drum or drums disconnected from the corresponding road wheels.

Figure 3:
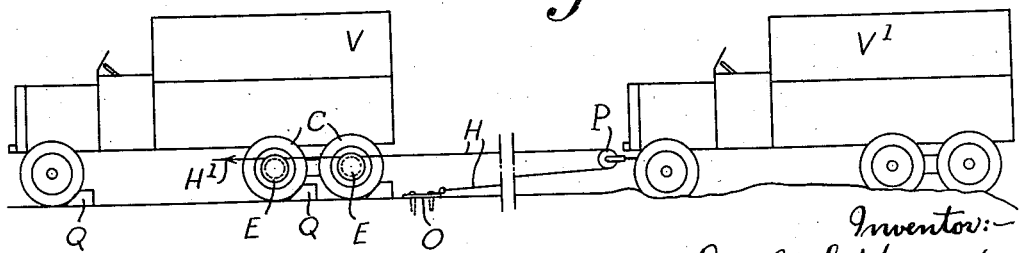
Fig. 3 is a diagram showing the use of two pulley drums upon a multi-axle vehicle for hauling a second vehicle out of difficulty.

For example, Fig. 3 illustrates the use of a six-wheeled vehicle V having two driving axles, that is with two differential gears and four driving wheels, for haulage work of this kind. A pulley drum E is fitted to each of the rear wheels C on one side, these wheels being disconnected from the drums E so that the vehicle can remain stationary. The haulage cable H is secured at one end to a fixed point, such as a ground anchor O, and passed over a pulley block P fastened to a second vehicle $V^1$ which is to be drawn out. The cable then runs around the two drums E on one side of the hauling vehicle V, and the free end $H^1$ is pulled tight by hand; upon transmission of the engine power to the drums E, the cable H will be wound in, thereby drawing the second vehicle forward. It will be noted that by reason of the two differential gears provided, both drums E engaged by the haulage cable can be rotated while the hauling vehicle V remains stationary, being held by suitably wedging scotches Q or the like.

Pulley drums E can evidently be fitted upon both ends of the driving axle or axles, the cable H being passed around one drum (or around two drums on the same side of the vehicle) and then taken round the pulley block P to a guide sheave at the anchorage O, from which it returns to a second pulley block on the vehicle $V^1$ and then back to the other side of the hauling vehicle V, where it is passed over the drum (or drums) on that side. This arrangement not only gives a multiple purchase but also balances the load and overcomes any tendency for the hauling vehicle V to slew round, as it does when only one drum is in use and a heavy pull is imposed; moreover, so long as the drive remains in balance, the work of the differential gear or gears is relieved, being limited to the equalization of the drive upon the drums secured to the axle shafts.

What I claim is:—

1. In a motor vehicle having an axle shaft, a driving member secured to said shaft, and a road wheel adapted to be driven from said shaft, a pulley drum, detachable means for securing said pulley drum to said driving member, a bearing member rotatable in relation to said pulley drum, and detachable means for securing said bearing member to said road wheel, said pulley drum and bearing member being concentrically mounted in relation to said shaft and road wheel, and detachable driving connections between said pulley drum and bearing member, said pulley drum and bearing member being detachable as a unit by removal of said securing means between said pulley drum and driving member and of said securing means between said bearing member and road wheel.

2. In a motor vehicle having an axle shaft, a driving member secured to said shaft, and a road wheel adapted to be driven from said shaft, a pulley drum secured to said driving member, a bearing member rotatable in relation to said pulley drum and secured to said road wheel, said pulley drum and bearing member being concentrically mounted in relation to said shaft and road wheel, and driving connections between said pulley drum and bearing member, said driving connections consisting of swivelling bolts pivotally mounted upon one and engageable in slots upon the other of two parallel flanges, said flanges being integral with said pulley drum and bearing member.

3. In a motor vehicle having an axle shaft, a driving member secured to said shaft, and a road wheel adapted to be driven from said shaft, a pulley drum, detachable means for securing said pulley drum to said driving member, a bearing member rotatable in relation to said pulley drum, detachable means for securing said bearing member to said road wheel, said pulley drum and bearing member being detachable as a unit by operation of both said detachable means for the purpose of removing the road wheel, and disconnectible means for driving said road wheel from said pulley drum through said bearing member and said detachable means.

4. In a motor vehicle having an axle shaft, a driving member secured to said shaft, and a road wheel adapted to be driven from said shaft, a pulley drum secured to said driving member, a bearing member rotatable in relation to said pulley drum and secured to said road wheel, said bearing member including an annular flange and a cylindrical boss, said cylindrical boss forming a bearing for said pulley drum independent of the wheel loading, said pulley drum having a slotted rim flange alongside said annular flange, and disconnectible means for driving said road wheel from said pulley drum, said driving means being carried by said annular flange and engageable with said slotted rim flange.

5. In a motor vehicle having an axle shaft, a driving member secured to said shaft, and a road wheel adapted to be driven from said shaft, a pulley drum, detachable means for securing said pulley drum to said driving member, a bearing member rotatable in relation to said pulley drum, detachable means for securing said bearing member to said road wheel, said pulley drum, bearing member and road wheel being detachable as a unit by operation of the first-mentioned detachable means, and said road wheel being removable from the detached unit by operation of the second-mentioned detachable means, and disconnectible means for driving said road wheel from said pulley drum, through said bearing member and said second-mentioned detachable means.

DONALD STUART KENNEDY.